United States Patent Office 3,194,823
Patented July 13, 1965

3,194,823
ORGANIC COMPLEXES
William M. Le Suer, Cleveland, and George R. Norman, Lyndhurst, Ohio, assignors to The Lubrizol Corporation, Wickliffe, Ohio, a corporation of Ohio
No Drawing. Filed Mar. 18, 1963, Ser. No. 266,022
8 Claims. (Cl. 260—414)

This application is a continuation-in-part of co-pending U.S. application Serial No. 858,603, filed December 10, 1959, which application is in turn a continuation-in-part of U.S. application Serial No. 410,461, filed February 15, 1954, and now abandoned.

This invention relates to novel barium- and cadmium-containing organic complexes. In a more particular sense it relates to stabilized halogen-bearing polymeric compositions containing said barium- and cadmium-containing organic complexes.

The particular halogen-bearing polymeric materials which are benefited most by the stabilizing action of the complexes of this invention are those which contain chlorine attached to an aliphatic carbon atom. Typical examples of such polymeric materials are the homopolymers and interpolymers of vinyl chloride. These polymeric materials have a tendency to decompose and evolve hydrogen chloride, especially when subjected to strong light and/or elevated temperatures. Such decomposition is undesirable for a variety of reasons, but particularly because it is associated with a darkening of the color of the polymeric material.

The use of minor amounts of additives for their stabilizing action with respect to such decomposition has been known for some time and these additives are for the most part presumed to act in a manner so as to inhibit the evolution of hydrogen chloride. This presumption is based upon the fact that many of the effective additives contain basically-reacting substances.

It is a principal object of the present invention to provide novel barium- and cadmium-containing organic complexes which are useful as stabilizers for halogen-containing polymeric materials, especially chlorine-containing polymeric materials.

It is also an object of the present invention to provide polymeric compositions having enhanced stability toward heat and light.

These and other objects of the invention are realized by the provision of a barium- and cadmium-containing organic complex made by the process which comprises preparing a mixture of:

(A) An alcohol,
(B) An aliphatic monocarboxylic acid compound selected from the group consisting of aliphatic monocarboxylic acids containing an average of at least about 6 carbon atoms and the barium and cadmium salts thereof, and
(C) A metallic base selected from the group consisting of barium bases and cadmium bases in an amount to provide in the mixture of components A–C, inclusive, at least about 0.1 equivalent each of cadmium and barium and a total of at least about 1.1 equivalents of barium and cadmium per equivalent of B;

removing substantially all water from said mixture and then treating said mixture with at least about $(x-y)$ equivalents of carbon dioxide, where $x$ represents the total equivalents of barium and cadmium in the mixture and $y$ represents the equivalents of B.

If desired, a phenol may also be present in the reaction mixture. The use of a phenol, while entirely optional with respect to the hereindescribed process, contributes to carbon dioxide utilization during carbonation and in many cases to the efficacy of the final barium- and cadmium-containing complex as a stabilizing agent.

In the preferred practice of the invention, the alcohol and aliphatic monocarboxylic acid compound are mixed well, the cadmium base is added, and the whole is heated (added water and/or a phenol being optionally present) at 70°–250° C., generally 110°–200° C., until substantially all of any water present has been removed. Thereupon, the barium base is added and the whole is heated for a further period at the above-indicated temperatures until substantially all of the water of reaction has been removed. Carbon dioxide is then dispersed through the reaction mixture at such temperatures to complete the formation of the desired barium- and cadmium-containing organic complex. The order of addition of components A–C, inclusive, is not critical and can differ from that described above, e.g., a mixture of all such components may be prepared and heated. It appears to be essential only that substantially all of any added water or water of reaction be removed from the mixture before the carbon dioxide is introduced. The presence of an excessive amount of water in the reaction mixture during carbonation tends to result in the formation of a complex which is not easily filtered, or which has poor clarity, or which is deficient in barium and cadmium. The water may be removed, as indicated, by simply heating the mixture to a temperature above 100° C. at atmospheric or subatmospheric pressure. If subatmospheric pressures are employed, temperatures below 100° C., e.g., 50–95° C., are likewise effective to remove substantially all of any water present. In general, the water content of the mixture should not exceed about 3% when carbonation is begun, although somewhat more water can be tolerated if the temperature during carbonation is maintained above 100° C. Best results are usually obtained when the amount of water does not exceed about 1% when carbonation is begun. At least enough carbon dioxide should be used to convert, on a theoretical basis, substantially all of the free barium and/or cadmium base to the corresponding metal carbonates. If substantially less than such amount is used, the complex will not be well adapted for the purposes of the present invention. In actual practice, a considerable excess over the minimum amount of carbon dioxide required is dispersed through the reaction mixture so as to insure substantially complete metal carbonate formation. Such minimum amount of carbon dioxide can be expressed as $(x-y)$ equivalents thereof, where $x$ represents the total equivalents of barium and cadmium in the mixture and $y$ represents the equivalents of B.

To facilitate the stirring of the mixture and the purification as, e.g., by filtration, of the complex formed, it is generally desirable to carry out the reaction in the presence of a diluent such as a mineral oil, especially a neutral distillate oil or a white oil, or a volatile inert solvent such as benzene, toluene, xylene, mesitylene, aromatic petroleum spirits, chlorobenzene, ortho-dichlorobenzene, nitrobenzene, kerosene, etc. If the diluent is a mineral oil, the complex, which is oil-soluble, is obtained in the form of a more or less concentrated solution in such oil. If the diluent is a volatile solvent, such solvent may be removed by distillation, if desired, to obtain the solvent-free complex.

As indicated previously, a portion of the barium and cadmium may be introduced into the reaction mixture as salts of the aliphatic mono-carboxylic acid. For example, the cadmium or barium salt of an aliphatic monocarboxylic acid may be employed as component B. For the purposes of the present invention, it is necessary only that there be present in the reaction mixture at least about 0.1 equivalent each of cadmium and barium and a total of at least about 1.1 equivalents of barium and cadmium per equivalent of component B. The term equivalent as employed herein is used in its ordinary chemical sense, i.e., an equivalent of barium, cadmium, or carbon dioxide is one-half mole thereof, an equivalent of an aliphatic monocarboxylic acid is one mole thereof, an equivalent of water is one-half mole thereof, etc.

The complexes of the present invention possess a "metal ratio" of at least about 1.1 and generally from about 1.5 to about 5, although it may be as high as 10 or more. The term metal ratio as used herein refers to the ratio of the total equivalents of metal, both barium and cadmium, in the complex to the equivalents of aliphatic monocarboxylic acid compound. Thus it will be appreciated that these complexes contain a stoichiometric excess of metal, i.e., more than is associated with the normal metal salt of the aliphatic monocarboxylic acid. The excess metal is believed to be present as colloidally dispersed metallic carbonate, but apart from this hypothesis little is known about the chemical composition of the complexes.

The amount of alcohol, i.e., component A, present in the mixture prior to carbonation is not critical. However, at least about 0.1 equivalent and preferably from about 1 to about 50 or more equivalents of component A per equivalent of component B should be used for optimum results. Water, which is optionally present in the process mass, may be present as water added as such to the mixture, or it may be present as "wet" alcohol, "wet" phenol, hydrates of the barium and/or cadmium bases, chemically combined water (e.g., $Ba(OH)_2$ may be regarded as $BaO+H_2O$), etc.

To accomplish the purposes of the present invention, it is important that the organic complex contain both barium and cadmium. If, for example, an alkali metal such as sodium is substituted for cadmium, the resulting barium- and sodium-containing organic complex is unsuited for the purposes of this invention.

A more detailed description of the principal components used in preparing the barium- and cadmium-containing organic complexes of this invention is set forth below.

COMPONENT A

This component, the alcohol, may be any one of the various available substituted or unsubstituted aliphatic or cycloaliphatic alcohols containing from 1 to about 20 or more carbon atoms. In most cases, the alcohol will be unsubstituted, i.e., it will conform to the formula ROH, where R is an aliphatic hydrocarbon radical or cycloaliphatic hydrocarbon radical containing from 1 to 20 carbon atoms. However, in some instances, the alcohol will contain organic and/or inorganic substituents such as aromatic radicals, homocyclic radicals, heterocyclic radicals, and nitro, ether, ester, sulfide, keto, amino, nitroso, etc., groups.

Examples of alcohols useful as this component include methanol, ethanol, n-propanol, isopropanol, n-butanol, isobutanol, n-pentanol-1, n-pentanol-2, isoamyl alcohol, n-hexanol-1, n-hexanol-2, 4-methyl-pentanol-2, n-heptanol, primary isooctanol (prepared for example, by the well known Oxo process), 2-ethylhexanol, n-octanol, 3,5,5-trimethyl-hexanol, cyclohexanol, methylcyclohexanol, ethyl-cyclohexanol, benzyl alcohol, beta-phenethyl alcohol, 2-alpha-pyridyl-ethanol-1, tetrahydrofurfuryl alcohol, 2-cyclohexyl-ethanol-1, n-decanol, n-undecanol, lauryl alcohol, isododecanol (prepared for example, by the hydration of triisobutylene), myristyl alcohol, oleyl alcohol, n-eicosanol, n-tricosanol, n-triacontanol, 2-phenoxy-ethanol-1, 2-phenoxyethoxy-ethanol-1, 6-chloro-n-hexanol-1, 8-nitro-n-octanol-1, 4-amino-cyclohexanol, ethylene glycol mono-oleate, glyceryl dipalmitate, 2-n-butoxy-ethanol-1, diethylene glycol mono-ethyl ether, 2-thiobutoxy-ethanol-1, etc. Of the various available alcohols, a preference is expressed for the aliphatic monohydric alcohols. Particularly preferred are the alkanols containing from about 6 to about 12 carbon atoms such as n-hexanol, primary isooctanol, 2-ethylhexanol, and lauryl alcohol. In lieu of a single alcohol, mixtures of two or more different alcohols may also be used. Thus, for example, a commercial mixture of $C_{10}-C_{12}$ alkanols is very well adapted to serve as this component.

COMPONENT B

The aliphatic monocarboxylic acid compound contemplated for use as this component includes the various available aliphatic monocarboxylic acids containing an average of at least about 6 carbon atoms, as well as their corresponding barium and cadmium salts. In most instances, this component will be at least one substituted or unsubstituted aliphatic monocarboxylic acid containing from about 6 to about 30 carbon atoms such as n-hexoic acid, capric acid, caprylic acid, 2-ethylhexoic acid, undecanoic acid, lauric acid, myristic acid, palmitic acid, oleic acid, linoleic acid, linolenic acid, tung oil acids, ricinoleic acid, 3,5,5-trimethyl-hexanoic acid, alpha-chlorostearic acid, alpha-nitrolauric acid, omega-amino-pentadecanoic acid, lauroxy-acetic acid, eicosanoic acid, mono-lauryl adipate, phenyloleic acid, phenylstearic acid, chlorophenylstearic acid, xylylstearic acid, alpha-pyridyl-oleic acid, tetracosanoic acid, behenic acid, stearolic acid, etc. A preference is expressed for the higher fatty acids such as lauric, palmitic, oleic, linoleic, linolenic, stearic, myristic, palmitic, etc., acids and mixtures of fatty acids containing an average of at least about 12 carbon atoms, by reason of their relatively low cost, availability, and excellence as starting materials for the preparation of the hereindescribed barium- and cadmium-containing organic complexes. For example, a mixture of 75 mole-percent of oleic and 25 mole-percent of caprylic acid (contains an average of 15.5 carbon atoms) is useful as this component. In lieu of caprylic acid, the synthetic acid, 2-ethylhexoic acid, may be used in such mixture.

COMPONENT C

This component, as noted previously, is at least one metallic base selected from the group consisting of barium bases and cadmium bases. It is used to provide in the mixture of components A-C, inclusive, at least about 0.1 equivalent each of cadmium and barium and a total of at least about 1.1 equivalents of barium and cadmium per equivalent of component B. When component B is a barium salt of an aliphatic monocarboxylic acid, component C will be a cadmium base plus, optionally, any additional barium base desired to increase the barium content of the final organic complex. When component B is a cadmium salt of an aliphatic mono-carboxylic acid, component C will be a barium base plus, optionally, any additional cadmium base desired to increase the cadmium content of the final organic complex. When the preferred practice of using an aliphatic monocarboxylic acid as component B is followed, component C will consist of at least 0.1 equivalent of a cadmium base and sufficient barium base, i.e., at least 0.1 equivalent thereof, to supply the required total of at least about 1.1 equivalents of barium and cadmium. In other words, in the preferred practice all of the barium and cadmium in the final organic complex will have been supplied by the barium base and the cadmium base of component C. In most instances from about 0.8 to about 2 equivalents each of barium base and cadmium base will be used per equivalent of component B.

The barium base of component C includes principally the various basically-reacting inorganic compounds of barium such as barium oxide, barium hydroxide, hydrated barium hydroxides, barium hydrosulfide, barium sulfide, barium amide, barium carbide, barium nitride, etc. In some instances, it is also feasible to use basically-reacting barium compounds such as carbonated barium alkoxides, barium ethoxide, barium isopropoxide, etc., although the inorganic barium bases are preferred by reason of their lower cost and availability.

The cadmium base of component C includes principally the various inorganic cadmium bases such as cadmium oxide, cadmium suboxide, cadmium hydroxide, hydrated cadmium hydroxides, cadmium sulfide, etc.

The phenols which are optionally present in the hereindescribed process mass include principally substituted and unsubstituted monohydric or polyhydric phenols. The substituents may be organic and/or inorganic. Examples of such phenols include phenol itself and alkylated and cycloalkylated mononuclear or polynuclear phenols containing from one to 150 or more carbon atoms in the substituent group or groups such as, for example, ortho-, meta-, and para-cresols; xylenols; para-ethylphenol; ortho, para-diethylphenol; n-propylphenol; para-isopropylphenol; tertiary butylphenol; n-amylphenol; para-tertiary amylphenol; para-cyclopentylphenol; cyclohexylphenol; methylcyclohexylphenol; secondary-hexylphenol; heptylphenol; diisobutylphenol; 3,5,5-trimethyl-n-hexylphenol; n-decylphenol; cetylphenol; oleylphenol; wax-alkylated phenol; polyisobutene-substituted phenol in which the polyisobutene substituent contains from about 20 to about 150 carbon atoms, etc.; aryl-substituted phenols such as phenylphenol, diphenylphenol, and naphthylphenol; polyhydroxy aromatic compounds such as alizarin, quinizarin, hydroquinone, catechol, pyrogallol, etc.; monohydroxy naphthalenes such as alpha-naphthol and beta-naphthol; polyhydroxy naphthalenes such as naphthohydroquinone and naphthoresorcinol; alkylated polyhydroxy aromatic compounds such as octylcatechol and mono-(triisobutyl) pyrogallol; and substituted phenols such as para-nitrophenol, picric acid, ortho-chlorophenol, tertiarybutyl chlorophenols, para-nitro ortho-chlorophenol, para-aminophenol, etc. In most instances the phenol, if used, will be a mono-alkyl phenol containing from about 4 to about 12 carbon atoms in the alkyl group. Thus, commercially available mono-alkyl phenols such as para-tertiary butylphenol, heptylphenol, and diisobutylphenol (i.e., tertiary-octylphenol) are preferred.

The following examples are presented to illustrate specific modes of preparing the barium- and cadmium-containing organic complexes of the present invention. These examples are offered for purposes of illustration only and are not to be construed as limiting the scope of the invention, except as the latter is defined by the appended claims. Unless otherwise indicated, all parts and percentages are by weight.

*Example 1*

Into a reaction vessel equipped with a stirrer and a side-arm water trap, there is introduced 792 parts of a neutral distillate oil having a viscosity of 100 Saybolt Seconds at 100° F., 291 parts (2.24 equivalents) of primary-isooctanol, 75 parts (8.30 equivalents) of water, 549 parts (1.94 equivalents) of oleic acid and 114 parts (0.6 equivalent) of heptylphenol. The whole is then heated to 76° C. and 130 parts (2.04 equivalents) of cadmium oxide is added. A slight heat of reaction is observed. Thereupon the mixture is heated to 150° C. and maintained at that temperature for 1 hour while 82 parts of water is removed by means of the side-arm water trap. Thereupon, 242 parts (2.56 equivalents) of barium hydroxide monohydrate is added to the mixture and the whole is stirred for 5 hours at 150–152° C. while 12 parts of water is collected in the side-arm water trap. An analysis of the mixture at this point shows it to contain about 0.5% of water. 321 parts more of oil is added and then 150 parts (6.8 equivalents) of carbon dioxide is introduced into the mixture over a period of 5 hours at 150–155° C. During the carbonation, 16 parts of water is observed to collect in the water trap. The carbonated mixture is then stripped of isooctanol and any remaining water at 160° C./10 mm. Hg. Filtration of the residue from the stripping operation yields a clear, bright filtrate, which is a 47.7% solution of the desired barium- and cadmium-containing complex in oil. The product shows the following analyses.

| | |
|---|---|
| Barium _____percent__ | 7.95 |
| Cadmium _____do____ | 5.22 |
| Combined $CO_2$ _____do____ | 2.48 |
| Metal ratio _____ | 2.32 |

*Example 2*

A barium- and cadmium-containing complex is prepared in the same manner set forth in Example 1 except that 330 parts (3.5 equivalents) of barium hydroxide monohydrate is used in lieu of the amount specified above.

*Example 3*

A barium- and cadmium-containing complex is prepared in the same manner set forth in Example 1, except that 645 parts (1.94 equivalents) of cadmium oleate is used in lieu of the specified quantities of oleic acid and cadmium oxide.

*Example 4*

1484 parts of the neutral distillate oil described in Example 1, 540 parts (4.15 equivalents) of primary-isooctanol, 100 parts (11 equivalents) of water, and 732 parts (2.60 equivalents) of oleic acid are introduced into a reaction vessel fitted with a stirrer and a side-arm water trap. The whole is stirred at 76° C. while 172.8 parts (2.68 equivalents) of cadmium oxide is introduced. The reactants are heated for 3 hours at 150–160° C. while water is removed by means of the water trap. Then 323 parts (3.32 equivalents) of barium hydroxide monohydrate is added over a period of 1.75 hours at 148–151° C. while additional water is removed by means of the water trap. 140 parts (6.4 equivalents) of carbon dioxide is then introduced into the reaction mass over a period of 2.5 hours at 150–155° C. Upon completion of the carbonation, the whole is stripped to a temperature of 145–155° C. at 71 mm. Hg to remove substantially all water and any alcohol present. Filtration of the residue from the stripping operation yields a clear filtrate, which is a 45.4% solution of the desired barium- and cadmium-containing complex in oil. The product shows the following analyses.

| | |
|---|---|
| Barium _____percent__ | 8.03 |
| Cadmium _____do____ | 4.75 |
| Metal ratio _____ | 2.1 |

The stabilized halogen-bearing polymeric compositions of this invention contain a minor proportion of the hereindescribed barium- and cadmium-containing complex. Small amounts of such a complex have been observed to be effective in enhancing the stability, particularly the thermal stability, of a polymeric material. The preferred range of concentration of the stabilizing agent of this invention is from about 0.1 to about 5 percent by weight based on the weight of the polymeric material. Thus, for every 100 parts of a polymeric material it has been found that a concentration of the stabilizing agent of this invention of from about 0.1 to about 5 parts is sufficient to stabilize such a material for most commercial applications. More than 5 parts may be used, of course, in certain applications where such higher concentrations provide desired benefits.

The barium- and cadmium-containing complexes of this invention are useful as stabilizers not only for homopolymers and interpolymers of vinyl chloride, but also for other polymers. Thus, they may be used as stabilizers for polyethylene, polypropylene, polyisobutylene, polystyrene, polyvinyl chloride, polyvinyl bromide, polyvinylidene chloride, interpolymers of vinyl chloride with vinyl acetate, ethylene, diethyl fumarate, dibutyl maleate, vinylidene chloride, and the like, interpolymers of isobutylene with isoprene, butadiene, styrene, and the like, and interpolymers of vinylidene chloride with diethyl maleate, methyl acrylate, acrylamide, vinyl acetate, and the like.

The following examples are presented to illustrate the effectiveness of the hereindescribed barium- and cadmium-containing complexes as stabilizing agents for halogen-bearing polymeric materials. Unless otherwise indicated, all parts are by weight.

Various stabilizing agents were incorporated into a polymeric material by milling them for 10 minutes at 150°–160° C. with a clear, colorless plasticized polyvinyl chloride composition consisting of 200 parts of polyvinyl chloride powder, 90 parts of dioctyl phthalate, and 10 parts of epoxidized soybean oil. The amount of stabilizing agent or agents used in each instance was calculated to add 0.15 part of barium and 0.1 part of cadmium per 100 parts of plasticized polyvinyl chloride composition. Each stabilized composition was milled to yield a sheet having an average thickness of 50 mils and from such sheet five 0.75-inch squares were cut. One square of each stabilized composition was evaluated immediately for color and clarity. The remaining four squares of each composition were placed in an oven maintained at 180° C. and withdrawn at intervals of 15, 30, 45, and 60 minutes for color and clarity determinations. The test results are given in the following table.

TABLE.—THERMAL STABILITY OF VARIOUS STABILIZED POLYVINYL CHLORIDE COMPOSITIONS

| Stabilizing Agent Employed | Inspector's Remarks; Square Observed After— | | | | |
|---|---|---|---|---|---|
| | 0 minutes (milled material per se) | 15 minutes | 30 minutes | 45 minutes | 60 minutes |
| Product of Example 1 | Clear, colorless | Clear, colorless | Clear, colorless | Clear, colorless | Clear, almost colorless. |
| Barium alkyl carboxylate and cadmium 2-ethylhexoate. | Cloudy, but otherwise colorless. | Cloudy, but otherwise colorless. | Faintly cloudy but otherwise colorless. | do | Clear, pronounced yellowing. |
| Barium and cadmium laurates | do | Cloudy, very yellowing. | Cloudy, slight yellowing. | Cloudy, moderate yellowing. | Cloudy, very pronounced yellowing. |

It will be noted that a barium- and cadmium-containing complex of the present invention is more effective than known barium- and cadmium-containing stabilizing agents in inhibiting the deterioration of a polyvinyl chloride composition.

In addition to the barium- and cadmium-containing organic complexes of this invention, the hereindescribed polymeric compositions may also contain known improving agents such as pigments, fillers, plasticizers, mold release agents, anti-static agents, anti-sticking agents, metal phenates such as barium octylphenate or calcium heptylphenate, organo-tin compounds, metal alkyl carboxylates such as the barium, strontium, calcium, zinc, or cadmium salts of fatty acids or synthetic carboxylic acids such as oleic acid, stearic acid, lauric acid, 2-ethylhexoic acid, etc., alkyl phosphites and phosphates, aryl phosphites and phosphates, oxidation inhibitors such as 2,6-di-tertiary-butyl-4-methylphenol or 4,4'-methylene-bis-(2,6-di-tertiary-butylphenol), and the like.

Representative of stabilized polyvinyl chloride compositions which contain a barium- and cadmium-containing complex of this invention and auxiliary improving agents are compositions which conform to the following formula:

| | Parts |
|---|---|
| Polyvinyl chloride | 100 |
| Plasticizer | 20–100 |
| Epoxidized fatty oil | 1–10 |
| Complex of this invention | 1.5–3.5 |
| Organic phosphite | 0.01–2.5 |
| Metal alkyl carboxylate | 0.01–0.5 |

Among the auxiliary improving agents which are especially preferred for use in accordance with the above formula are dioctyl phthalate (plasticizer), epoxidized soyabean oil, triphenyl phosphite, trioctyl phosphite, tridecyl phosphite and zinc 2-ethylhexoate.

The barium- and cadmium-containing complexes of this invention are likewise useful as improving agents for paints, enamels, varnishes, lacquers, metal primers, lubricating oils and greases, fuel oils, gas oils, gasoline, rust-inhibiting compositions, slushing oils, textile treatment compositions, emulsifying compositions, asphalt and asphalt emulsions, fire-proofing compositions, tanning compositions, bonding agents for ceramics and asbestos, etc. They find their principal utility, however, as stabilizing agents for halogen-bearing polymeric materials.

What is claimed is:

1. A barium- and cadmium-containing organic complex made by the process which comprises preparing a mixture of:
   (A) a monohydric alcohol containing from 1 to about 20 carbon atoms,
   (B) at least one aliphatic monocarboxylic acid compound selected from the group consisting of aliphatic monocarboxylic acids containing an average of from about 6 to about 30 carbon atoms and the barium and cadmium salts thereof, and
   (C) at least one metallic base selected from the group consisting of barium bases and cadmium bases in an amount to provide in the mixture of components A–C, inclusive, at least about 0.1 equivalent each of cadmium and barium and a total of at least about 1.1 equivalents of barium and cadmium per equivalent of monocarboxylic acid;

removing substantially all water from said mixture by heating at a temperature of from about 70° C. to about 250° C. and then treating said mixture with at least about $(x-y)$ equivalents of carbon dioxide, where $x$ represents the total equivalents of barium and cadmium in the mixture and $y$ represents the equivalents of B.

2. A complex in accordance with claim 1 characterized further in that the monohydric alcohol of A is an aliphatic monohydric alcohol.

3. A complex in accordance with claim 2 characterized further in that the aliphatic monohydric alcohol is an alkanol containing from about 6 to about 12 carbon atoms.

4. A complex in accordance with claim 1 characterized further in that the aliphatic monocarboxylic acid compound of B is at least one aliphatic monocarboxylic acid containing an average of from about 12 to about 30 carbon atoms.

5. A complex in accordance with claim 4 characterized further in that the aliphatic monocarboxylic acid is a fatty acid.

6. A complex in accordance with claim 1 characterized further in that the metallic base of C consists of from about 0.8 to about 2 equivalents each of barium hydroxide and cadmium oxide per equivalent of B.

7. A complex in accordance with claim 1 characterized further in that the alcohol of A is primary-isooctanol, the aliphatic monocarboxylic acid compound of B is oleic acid, and the metallic base of C consists of barium hydroxide and cadmium oxide.

8. A complex in accordance with claim 7 characterized further in that heptylphenol is additionally present in the mixture of primary-isooctanol, oleic acid, barium hydroxide, and cadmium oxide.

(References on following page)

References Cited by the Examiner

UNITED STATES PATENTS 2,767,209 10/56 Asseff et al. _____ 252—33
3,057,896 10/62 Schlicht et al. _____ 252—18

FOREIGN PATENTS 210,336 9/52 Australia.
518,011 11/55 Canada.

DANIEL E. WYMAN, *Primary Examiner.*